Patented Nov. 30, 1937

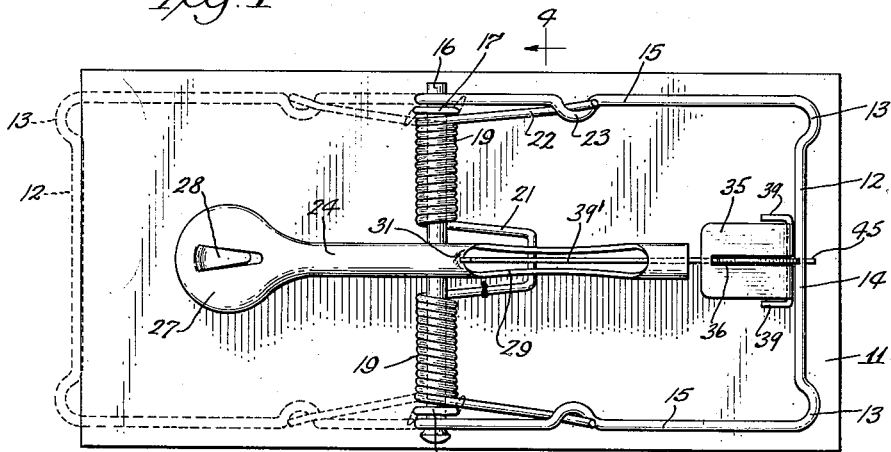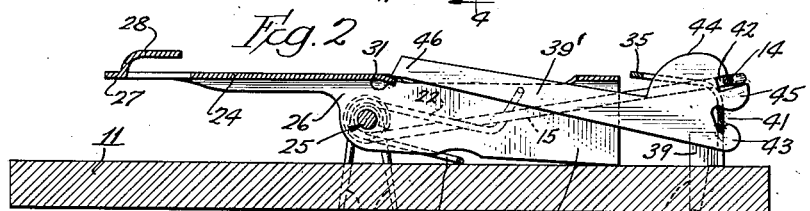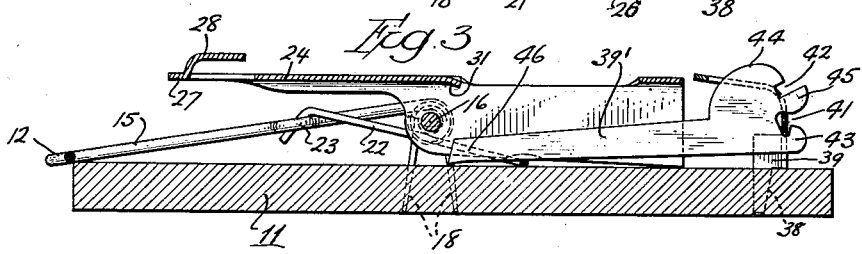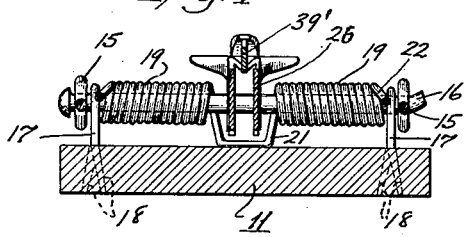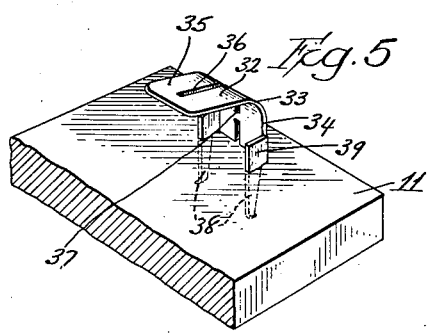

2,100,925

UNITED STATES PATENT OFFICE 2,100,925

ANIMAL TRAP

Herbert A. Stilson, Chicago, Ill., assignor of one-half to A. S. Nichols Western Company, Chicago, Ill., a corporation of Illinois Application July 30, 1932, Serial No. 626,349

11 Claims. (Cl. 43—83)

This invention relates to animal traps and more particularly to traps of the type commonly known as rat and mouse traps. An object of this invention is to provide an improved trap which may be made at extremely low cost so that the improved trap may sell in direct price competition with inferior traps generally supplied to the trade.

An important object of the invention is the provision of a simple, economically constructed trap which may be set by a mere movement of its parts, bringing the spring pressed jaw or bait into position by a single movement of it into automatic engagement with a sensitive latching member.

Another object of the invention is to provide an animal trap having a relatively strong spring operated jaw releasable by a slight movement of the bait holding member and which will be firmly held in said position against accidental release.

Numerous other objects and advantages of the invention will be apparent as it is better understood from the following description, which, taken in connection with the accompanying drawing, discloses a preferred embodiment thereof.

Referring to the drawing,

Figure 1 is a top plan view of a trap embodying the present invention in which the full lines showing the jaw illustrate the set position and the dotted lines show the release position;

Fig. 2 is a vertical, longitudinal section taken through the center of Fig. 1 and showing the parts arranged in set position;

Fig. 3 is a similar view showing the parts arranged in release position;

Fig. 4 is a section taken substantially on a line 4—4 of Fig. 1; and

Fig. 5 is a partial fragmentary perspective taken through the base and showing the latch holder.

The trap shown upon the drawing and which constitutes the embodiment of the invention at present preferred, comprises a base 11 preferably constituted of a wood block of rectangular shape. A jaw 12 is provided and is composed of a relatively stiff wire bent intermediate its ends at 13 to provide a central portion 14 and leg portions 15 pivoted upon a rod or nail 16 arranged through two staples 17 secured as indicated at 18 in the wood base. The free ends of the legs 15 are bent back upon themselves to form eyes which engage about the pivot 16 beyond the staples 17.

The jaw is constantly urged toward the position shown in Fig. 3 by a coil spring composed of a wire member having two spirally wound sections 19 embracing the pivot pin 16. These coil sections are connected at adjacent ends by an integral loop part 21 of the wire which bears upon the wood base as may be observed in Figs. 2 and 3. The outer ends of the coil are extended at 22 for engagement over or within loop parts 23 of the jaw legs 15, the arrangement being such that tension stored in the coil tends to press the jaw up and over from the position shown in Fig. 2 to that illustrated in Fig. 3.

A bait holder or treadle member is also pivoted upon the pin 16. This bait or treadle member consists or may consist of a piece of sheet metal bent throughout its major part to U-section, the pivot pin passing through suitably provided apertures 25 in the vertical or leg parts 26 of the U-shaped section of the treadle member. At the front the treadle member is enlarged at 27 and provided with a tang 28 to hold the bait. From just rearwardly of the pivot pin 16 the central part of the U-portion of the treadle member is cut away at 29 to provide a slot for passage of the latch and a forward holding shoulder 31 which may be engaged by the latch to hold the trap in set position as will be more fully explained.

A latch holder 32 is provided at the rear of the trap and this is preferably constructed of sheet metal having a body of rectangular shape bent around into a curve at 33 to provide a vertically extending portion 34 and a forwardly, horizontally extending portion 35. A central slot 36 extends from near the front end of the latch holder throughout its horizontal portion and down throughout its vertical portion and this slot is interrupted by a bridge member 37 intermediate the vertical part of a latch holder body. Two flat metal tangs or prongs 38 are arranged to be driven into and through the wood base and clinched against its under face (see Figs. 2, 4 and 5) to secure the latch holder in position and side wings 39 extend from the vertical part of the body to limit the insertion of the tangs in the base.

The latching member is indicated by reference character 39' and consists or may consist of a single flat piece of sheet metal provided with two slots 41 and 42 at its rear end. The slot 41 is undercut to provide an outer hook part 43. The slot 41 is intended to receive and permanently engage the interruption or bridge part 37 of the holder to pivotally secure the latch member in assembled relation. This assembly is accomplished before the tangs 38 are driven into the wood base. Above the slot 42 a rounded extension 44 is formed in the latching member and this extension and the part 45 between the slots 41 and 42 extend through the slot 36 of the latch holder in guided relation. The part 45 of latch member 39' has a rounded or cam under portion as shown clearly in Figs. 2 and 3. With the bar 14 of the trigger member bearing against the top of the part 45 as shown in Fig. 2, the latch member is moved rearwardly by virtue of the cam portion of part 45 so as to take up the slack in the pivotal connection of said latch member.

The latch member extends forwardly to closely adjacent the pivot 25 and such construction arranges the free end 46 of the latching member in position to strike the forward end of the opening 29 when the latch member is swung upwardly and thereafter tilt the bait holding treadle forwardly so that the latch member passes up through the slot and is moved down upon the shoulder 31.

The setting of the trap is accomplished by swinging the jaw from the position shown in Fig. 3 over in a clockwise direction and the dimension of the parts is such that the jaw clears the round extension 44 and engages the part 45 between the slots. A slight further movement of the jaw causes the latch member to swing up about its pivotal connection with the latch holder until its free end 46 is above the shoulder 31 when release of the jaw causes the end 46 of the latch member to move down upon the shoulder, thus limiting further movement of the latch member. Thus arranged the part of the latch above the slot 42 is disposed above the jaw and prevents its return until a pressure is exerted upon the bait holding part of the treadle to move it down and release the latch.

It is thought that this invention and many of its attendant advantages will be understood from the foregoing description, and it will be apparent that many changes may be made in the form, construction and arrangement of the parts without departing from the spirit and scope of the invention or sacrificing all of its material advantages, the form hereinbefore described being merely a preferred embodiment thereof.

I claim:

1. An animal trap comprising a base, a spring actuated jaw pivoted thereon, a latch holder extending up from said base and having alined slots therein and a transverse bridge separating said slots and a jaw latching member having a substantially horizontally extending open-ended slot engaging said bridge, with the upper wall of said slot resting on said bridge whereby said latching member is pivotally supported by said latch holder, and a downwardly facing shoulder on said latching member spaced from said slot for engaging said said spring actuated jaw.

2. An animal trap comprising a base, a spring actuated jaw pivoted thereon and a latch holder extending up from said base, and a flat, vertically disposed sheet metal latching member for engaging said jaw hooked to said latch holder and having pivotal movement therein.

3. An animal trap comprising a base, a spring actuated jaw pivoted thereon, a latch holder extending up from the base and having a pair of alined slots spaced apart by a bridge, and a flat vertically disposed latching member for engaging said jaw having one open-ended slot engaging the bridge to form the pivotal connection and a second slot for engaging said spring actuated jaw, the direction of the first slot being such that its sides, in their natural positions, resist the pull of the jaw.

4. An animal trap including a base, a spring actuated jaw pivoted thereon, and a jaw-holding assembly secured thereto and formed of two sheet metal members pivotally locked together, one being a support member secured to said base and having a pivot member formed thereon, and the other being a flat, vertically disposed latch having two extensions straddling said pivot member, one of which is hooked around it to retain said latch to said support without bending of the extensions.

5. An automatically set trap comprising a base, a spring actuated striker, a latch member provided with a pivotal aperture, a bait treadle having a trigger portion for engaging said member, said member having a slot extending from the pivotal aperture above the bottom thereof to an edge of the member, and a pivotal support for said member comprising guiding portions having parallel guiding surfaces, having at their lower edges attaching points for securing them to the base, and being united by a horizontally disposed integral pivot portion, adapted to pass through said slot and engage the pivotal aperture in the member.

6. An automatically set trap comprising a base, a spring actuated striker, a latch member provided with a pivotal aperture having unequal transverse dimensions, and a reduced slot extending therefrom to an edge of the member, a bait treadle having a trigger portion for engaging said member, and a pivotal support for said member comprising guiding portions having parallel guiding surfaces, having at their lower edges points for securing them to the base and being united by a horizontally disposed integral pivot portion having unequal transverse dimensions, slightly less than the corresponding dimensions of said aperture, the minor dimension of said pivot portion being sufficiently less than that of said slot to permit the pivot portion to pass through said slot into said pivotal aperture.

7. An automatically set trap comprising a base, a spring actuated striker, a latch member provided with a pivotal aperture having unequal transverse dimensions, and a reduced slot extending in one direction to an edge of said member, a bait treadle having a trigger portion for engaging said member, and a pivotal support for said member comprising guiding portions having parallel guiding surfaces, having at their lower edges points for securing them to the base, and being united by a horizontally disposed integral pivot portion having unequal transverse dimensions for engaging said aperture, the major dimensions of said aperture and said pivot portion being substantially perpendicular to said direction, and the minor dimension of said pivot portion permitting it to pass through said slot.

8. An automatically set trap comprising a base, a spring actuated striker, a latch member provided with a pivotal aperture, and a reduced slot extending therefrom to an edge of the member, a bait treadle having a trigger portion for engaging said member, and a pivotal support for said member comprising guiding portions having parallel guiding surfaces, having at their lower edges points for securing them to the base and being united by a horizontally disposed integral pivot portion having unequal transverse dimensions, the greater of which is slightly less than the corresponding dimensions of said aperture, the minor dimension of said pivot portion being sufficiently less than that of said slot to permit the pivot portion to pass through said slot into said pivotal aperture, each of said guiding portions being provided with a horizontally disposed shoulder adjacent to the inner ends of said points for engaging the upper face of the base, and positioning the pivot part with respect thereto.

9. In an automatically set trap the combination with a base, of a spring actuated striker provided with a cross bar, and having a pivotal connection with the base, of a latch member pivotally connected to said base, and provided with a forwardly extending trigger engaging arm and a rearwardly extending detent portion located substantially directly above the axis of the pivotal connection of the member, and a pivotally mounted bait treadle having a trigger portion to extend beneath the said arm of the member, the detent portion of the member having a cam portion coacting with the cross bar of the striker to move the latch member rearward by taking up slack in its pivotal connection, and permit the cross bar to engage beneath the detent, in setting the trap with the member in operative relation with the trigger.

10. In an automatically set trap the combination with a base, of a spring actuated striker having a pivotal connection with the base, of a latch member pivoted to said base, and provided with a rearwardly extending detent portion, substantially directly above the pivot of the member, a rearwardly extending lever portion below the detent, and a forwardly extending trigger engaging arm, the pivotal axis of said member being so located as to prevent the striker from engaging the said detent forward of the pivotal axis of the member, said detent having its lower face disposed at such an angle as to insure the downward movement of said trigger engaging arm by the striker when the trap is sprung, and a bait treadle formed of sheet metal and provided with a bait holder forward of the axis of the striker, and a portion extending rearwardly of the pivotal connection of the striker having an elongated slot therein and provided with downwardly extending counterbalancing wings on opposite sides of said member, said wings being provided with pivotal apertures, said bait treadle having a trigger portion at the forward end of the slot extending substantially coaxially with the axis of said pivotal apertures, and a pivot connected with said base extending through said apertures in said wings.

11. An automatically set trap comprising a base, a spring actuated striker, a latch member provided with a pivotal aperture, and a reduced slot extending therefrom to an edge of the member, a bait treadle having a trigger portion for engaging said member, and a pivotal support for said member comprising guiding portions having parallel guiding surfaces, having at their lower edges points for securing them to the base and being united by a horizontally disposed integral pivot portion having unequal transverse dimensions, slightly less than the corresponding dimensions of said aperture, the minor dimension of said pivot portion being sufficiently less than that of said slot to permit the pivot portion to pass through said slot into said pivotal aperture, but the pivot portion being so positioned as to so restrict the pivoting of the latch member when said pivotal support is secured to said base that removal of the latch member is prevented by the relationship of said slot, aperture and pivot.

HERBERT A. STILSON.